Jan. 23, 1968  E. I. NILSSON  3,364,861
CONTROL SYSTEM FOR MAINTAINING A LIQUID LEVEL CONSTANT
Filed Aug. 26, 1965  3 Sheets-Sheet 1

INVENTOR
Erling Ingvar Nilsson

BY Pierce, Scheffler & Parker
ATTORNEYS

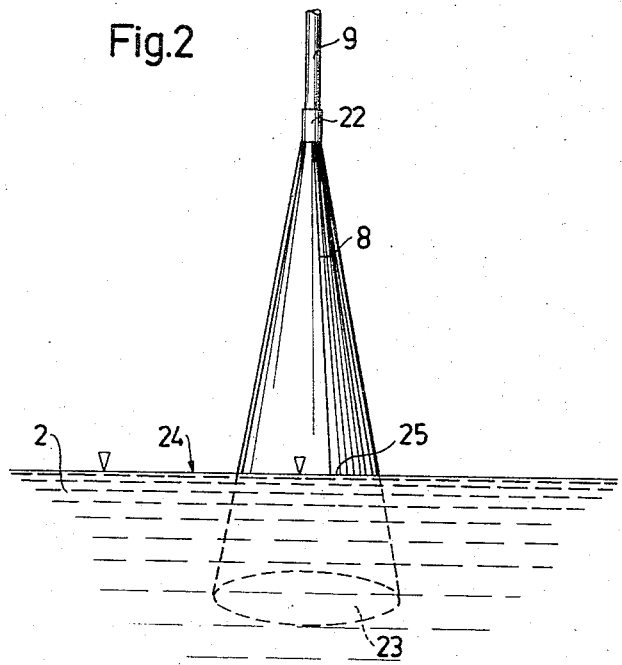
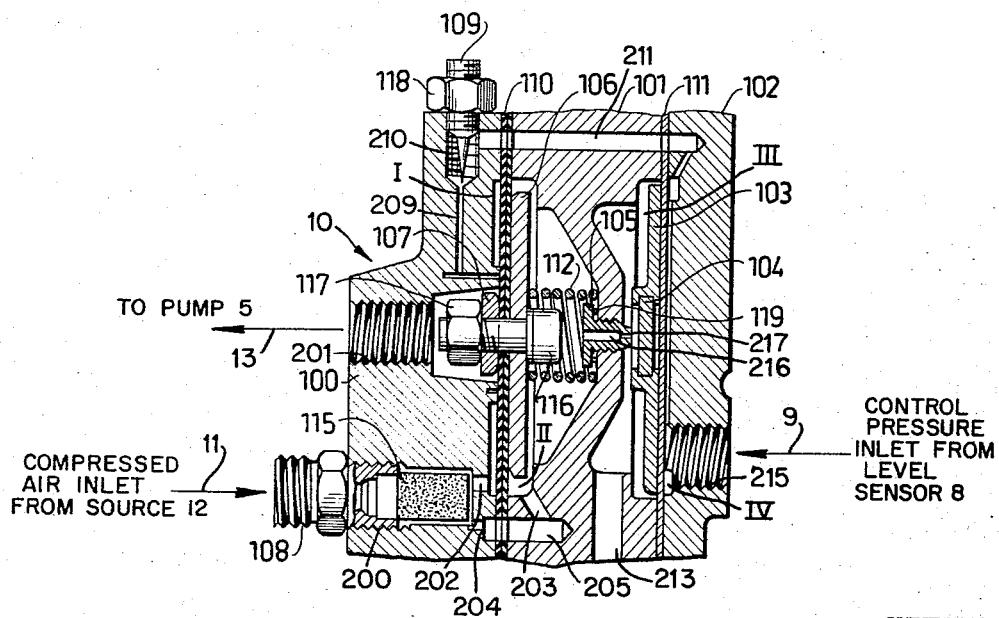

United States Patent Office 3,364,861
Patented Jan. 23, 1968

3,364,861
CONTROL SYSTEM FOR MAINTAINING A
LIQUID LEVEL CONSTANT
Erling Ingvar Nilsson, Lund, Sweden, assignor to AB
Akerlund & Rausing, Lund, Sweden, a company of
Sweden
Filed Aug. 26, 1965, Ser. No. 482,860
Claims priority, application Sweden, Sept. 28, 1964,
11,590/64
5 Claims. (Cl. 103—13)

ABSTRACT OF THE DISCLOSURE

A control system for maintaining a liquid in a container at a constant level comprises a supply source for the liquid connected to the container by way of a conduit including a compressed air operated pump the operation of which is controlled by means of a pneumatic pressure differential responsive main valve inserted between the pump and its compressed air source. The valve is controlled by a liquid level sensing unit located in the container which transmits a corresponding pneumatic pressure servo signal to the main valve. A drop in level of the liquid in the container below the level desired to be maintained results in a drop in the servo pressure signal which results in an opening of the main valve to thus actuate the pump for the liquid. Conversely, a rise in level of the liquid above the level desired to be maintained results in a rise in the servo pressure signal which serves to close the main valve and stop the pump.

---

The present invention refers to the art of controlling liquid levels. More particularly, the invention is concerned with a device adapted especially for level control of sticky or easily solidifying liquids such as adhesives or melted plastics. A special need is satisfied by the invention, in that it makes possible an efficient control for example of ink or paste baths in which an ink or paste roll rotates.

One has previously used floats for sensing the level in ink or paste baths. Through mechanical, hydraulic, pneumatic or electric means the floats have controlled a valve for controlling the liquid level. A float requires a relatively great space, for which reason the vessels containing the liquid had to be made excessively large.

Naturally, a float is adapted to operate on the surface of a liquid. When the liquid is in violent movement, which is the case when a roll rotates in the bath, a certain amount of liquid will always splash up over the sides, and top of the float. This splash will come into intimate contact with the air, whereby a thick layer of solidified liquid, plastic, paste or ink, will quickly be formed on the float. This must be scraped off from time to time in order that the float shall be able to function at all in the manner intended. An object of the present invention is to eliminate these drawbacks.

It has also been proposed to use level sensing means which include one or more level sensing electric contacts. It is true that they require less space than floats, but a layer of solidified liquid will gradually be formed on them as well, whereby they will no longer operate in the manner intended. In certain cases it is also desirable for other reasons to employ non-electric means. In the control of explosive or greatly inflammable liquids it will be impossible to use either electric sensing means, electric valve control means or electric means generally in the vicinity of the liquid.

Generally, as already mentioned, the level sensing means have operated a valve member, which has controlled the supply of liquid to the bath. A control system according to the invention also requires a control valve which controls the supply of liquid to the bath. Owing to the specilc problems which are encountered in a control system according to the invention a special control valve must be used which senses and responds to small pressure variations.

Therefore, the present invention refers to a control system for maintaining the level of a liquid 2 in a vessel 1 constant, characterized by a pump 5 adapted to pump liquid from a container 7 to said vessel, and by a control means 10 adapted to regulate the amount of liquid fed by the pump into said vessel, and by a level sensing member 8 consisting of a hollow body which is immersed in the liquid and whose interior communicates with the liquid in the vessel, the air above the inner surface being in communication with said control means through a pressure conduit 9 for transmitting the actual value of the control quantity, i.e. the liquid level, to the control means.

The control valve is characterized by a servo-controlled main valve for opening and closing an air conduit between said compressed air supply and said pump, and by a servo-unit connected to said pressure conduit from the level sensing member to control said main valve.

Further characteristics of the invention will be apparent from the following example of construction which will be described with reference to the accompanying drawings, in which:

FIG. 1 diagrammatically represents a control system according to the invention,

FIG. 2 shows a level sensing member,

FIG. 3 shows a control valve which is included in the control system according to the invention.

Figure 1:
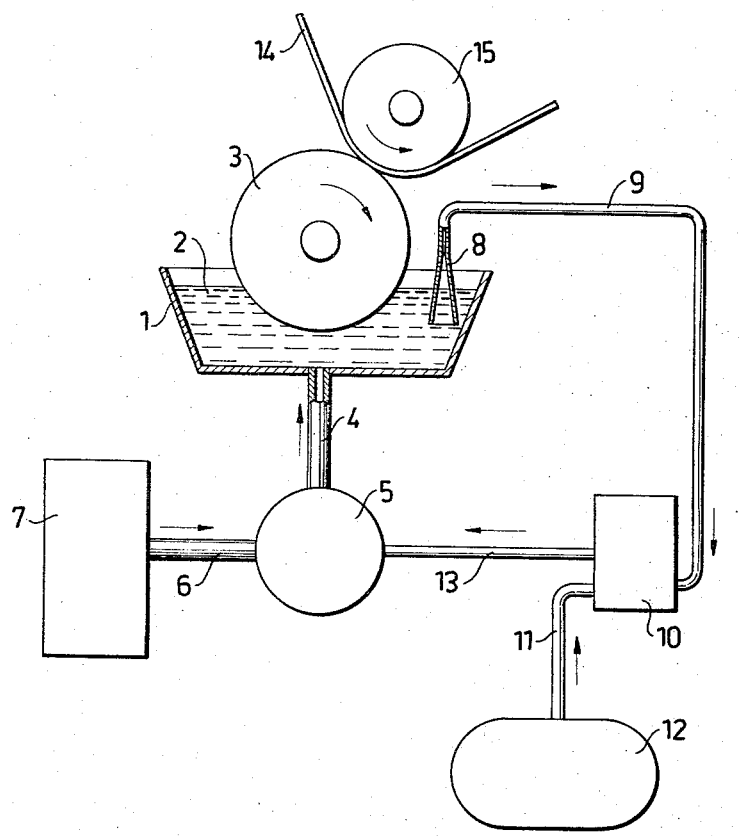

In FIG. 1 which shows a control system for maintaining a liquid level constant, the liquid 2 is contained in a vat 1. The liquid consists for example of ink, paste the like. The device according to the invention has proved to be particularly advantageous, when the liquid consists of a viscous, easily solidifying product such as paste or plastic.

A roll 3 rotates in the liquid bath for taking up a suitable amount of liquid which in the following is assumed to consist of paste. The paste is transferred to a web of material 14 which is advanced between the paste roll 3 and a counter-roll 15. The paste is pumped into the vat 1 by a pump 5 from a container 7 through conduits 4 and 6. The pump is driven by compressed air and advantageously operates in pulse fashion.

A level sensing member 8 is connected with a control valve 10 through a pressure conduit 9. From FIG. 2 it will be more clearly seen how the level sensing member is intended to be designed. It may simply consist of a tube, for example the conduit 9, immersed direct in the liquid 2. However, the tube is very narrow, only a couple of millimetres in diameter, so that it would be clogged very soon, when the liquid consists of paste or other substance solidifying in the air. Therefore, the part of the tube which is immersed in the paste has been made with a diameter very much greater than that of the rest of the tube. In the example shown the lower part is made as a cone 8 which is attached to the tube 9 by a clamp 22. The cone 8 has a bottom orifice 23 which in normal cases is situated under the outer liquid level 24. The outer vessel, i.e. the vat 1, and the cone 8 function as communicating vessels. Due to the hydrostatic pressure in the outer liquid, the liquid level 25 will therefore tend to rise within the cone to substantially the same height as the outer liquid level 24. This is made possible by displacing the air in the tube 9.

If a small change of level of the liquid 2 should take place, for example by the liquid rising slightly, the inner liquid surface also tends to rise a corresponding distance. However, it is then required that the air in the cone 8 and in the tube 9 is displaced. This air displacement is utilized for actuating the control valve 10, which controls the liquid flow to the vessel 1 by controlling the air to the air operated pump 5. The control valve is for this purpose connected between an air container 12 and said pump. The air is carried from the pressure container 12 and the pump 5 through conduits 11 and 13.

According to the invention, a value of a liquid level difference is thus obtained direct in the form of a small air pressure. The small air pressure is transferred direct to the control valve. As very small pressure variations are available for the operation, approximately 0.1–0.2 pound/cm.$^2$ corresponding to 1 to 2 mm. liquid level change, the control valve must be constructed in a particular way. It has been attempted to solve the problems arising from the specific purpose of the control valve and from the specific means available for controlling it by the use of a control valve including, on the one hand, a servo-controlled main valve for opening and closing the air conduit 11, 13 between the air pressure supply 12 and the pump 5, on the other hand a servo-unit connected to the pressure conduit 9 from the level sensing member 8, said servo-unit being relied upon to control said main valve.

Figure 4:
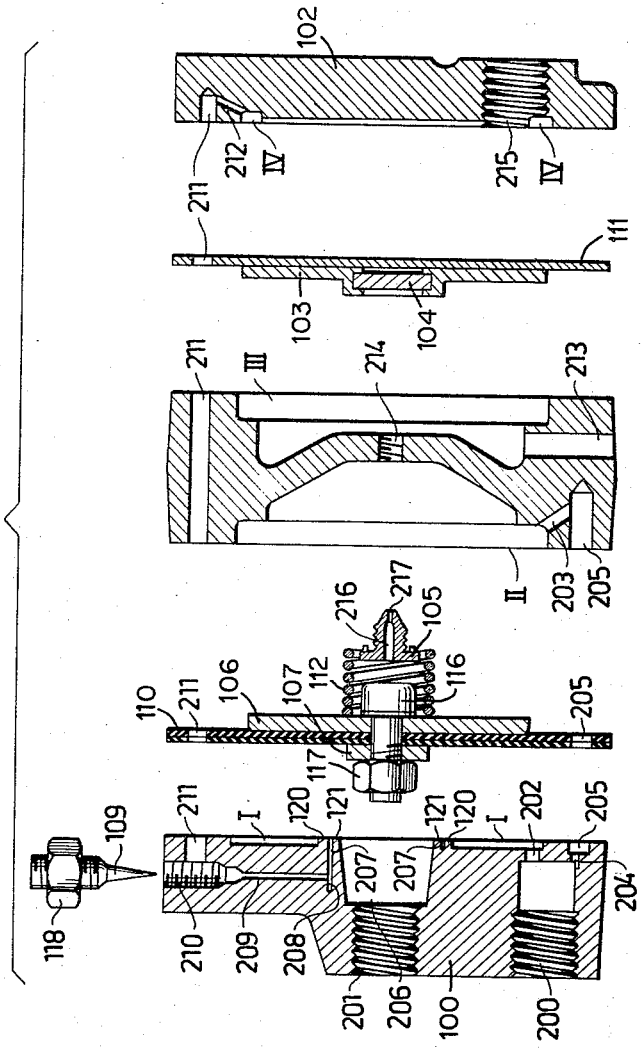
FIG. 4 shows the control valve in an exploded view for illustrating the various components of the valve more clearly.

FIGURES 3 and 4 illustrate more closely how such a control valve is to be constructed. The device comprises three main parts, viz. the valve seat 100, the valve body 101 and the cover 102. Between and within these main parts are besides a number of individual elements, among which may be noted two washers 106 and 107, with an intermediate diaphragm 110, a screw 116, a compression spring 112, a nozzle 105, a valve disc 103 with a sealing washer 104 and a diaphragm 111. Furthermore, there is a needle screw 109 and connection pieces, of which the one shown in FIG. 3 is also provided with a filter 115.

The valve seat 100 is provided with two borings 200 and 201 intended to receive the connection pieces for the inlet from the compressed air supply 12 and the outlet to the pump 5, respectively. From the boring 200 for the inlet there is, on the one hand, a channel 202 leading to a diaphragm chamber I and, on the other hand, a channel 205, 203 leading through a throttle orifice 204 to a diaphragm chamber II. Between the diaphragm chamber I and a boring 206 for the nut 117 and the washer 107 a notch 207 is cut out. From this notch 207 which is defined by two walls 120 and 121, a channel 208, 209 leads to a chamber 210. So as to form a throttle valve the chamber 210 is adapted to receive the needle screw 109, the penetration of which into the chamber 210 is controlled by means of the nut 118. Finally, a channel 211 leads from the throttle-valve chamber 210 to a diaphragm chamber IV in the cover 102.

In addition to the diaphragm chamber II and the channels 205, 203 and 211, the valve body 101 has still another diaphragm chamber III and a connection 213 between said diaphragm chamber III and the surrounding atmosphere. Further, there is a connection 214 between the diaphragm chambers II and III to receive the nozzle 105 which through an intermediate washer 119 engages the wall between said chambers.

Finally, among the three main parts the cover 102, in addition to said diaphragm chamber IV and channels 211 and 212, also has a boring 215 intended to receive a connection piece for the pressure line 9 from the level sensing member 8.

The nozzle 105 has a passage 216 with a throttle orifice 217. Said passage and throttle orifice form a connection between the diaphragm chambers II and III.

The diaphragm 110 is provided with through-passages 205 and 211. Actually, the layers consists of two diaphragms 110 which will be seen from the figures. The left-hand layer engages the valve seat 100 and is manufactured from a rubber having good sealing properties. The right-hand layer is intended to support the left-hand one and is therefore manufactured from a rubber quality for example with canvas inserts.

The diaphragm 111, which is also provided with a through-passage 211, is manufactured from a thin paraffin-impregnated material which is very sensitive to small pressure variations.

The system functions in the following way:

Case A: The liquid level 24 is at a level below that desired, and the conduit 6 for supplying liquid from the container 7 is connected to the pump 5 and the conduit 11 for supplying compressed air from the compressed air supply 12 is connected to the control valve 10.

Hence, air is passed through the air filter 115 and the channel 202 to the diaphragm chamber I which is thereby filled with air. Via the throttle orifice 204, which has a diameter of about 0.5 mm., air leaks through the passage 205, 203 into the diaphragm chamber II. From the diaphragm chamber II the air passes through the passage 216 and throttle orifice 217 of the nozzle 105, said throttle orifice being slightly wider than the throttle orifice 204 between the diaphragm chambers I and II, into the diaphragm chamber III and from there to the surrounding atmosphere through the channel 213.

The diaphragm 110 between the diaphragm chambers I and II now moves to the right, owing to the pressure in diaphragm chamber I being greater than in diaphragm chamber II, whereby the valve seat 100 is opened for the passage of air from the air pressure supply 12, via conduit 11, air filter 115, diaphragm chamber I, and conduit 13 to the pump 5. At the same time diaphragm chamber IV receives air via the throttle valve, i.e. from the now uncovered notch 207 through the passage 208, 209 to the throttle valve chamber 210 and further from the throttle valve chamber through channels 211 and 212. The air in the diaphragm chamber IV is propagated through the conduit 9 to the sensing member 8. The pump 5 operates to pump liquid, filling the vessel 1 to the desired level.

Case B: The liquid level 24 is at a level above that desired, other conditions being unchanged.

A raising of the outer liquid level 24 causes an air pressure within the sensing member 8 due to the inner liquid level 25 tending to occupy the same level as the outer level 24. The overpressure of the air within the member 8 is passed through the pressure conduit 9 to the diaphragm chamber IV of the control valve 10. Due to the pressure thus produced in the diaphragm chamber IV the diaphragm 111 is moved to the left together with the diaphragm disc 103. The sealing washer 104 is thereby pressed against the nozzle 105, whereby the throttle orifice 217 is closed. Due the pressure thus produced in the diaphragm chamber IV, the diaphragm 111 is moved to the left together with the diaphragm disc 103. The sealing washer 104 is thereby pressed against the nozzle 105, whereby the throttle orifice 217 is closed. As a consequence thereof the pressure rises in the diaphragm chamber II and rapidly reaches the same value as in diaphragm chamber I or at least such a value, in relation to the pressure in the diaphragm chamber I, that the spring 112 may move the diaphragm 110 into sealing engagement with the valve seat 100, whereby the outlet to the pump 5 is closed. The notch 207 is also closed and thereby the connection to diaphragm chamber IV. The pump stops, and the pressure in the outlet conduit 13 gradually drops below the pressure in the chamber II, whereby the pressure in the chamber assists in closing the outlet to the pump.

When the liquid in the vat 1 has again dropped below the desired level owing to liquid being transferred to the material 14, the process of case A is repeated.

I claim:

1. In a control system for maintaining the level of a liquid in a vessel 1 constant, the combination comprising a source 12 of compressed air, a pump 5 actuated by compressed air from said source for pumping liquid from a supply container 7 to said vessel, control valve means 10 interposed in an air flow conduit 11, 13 between said compressed air source and said pump for controlling the compressed air flow to said pump and hence controlling the liquid output from said pump, said control valve means including a servo-controlled main valve 100, 110 for opening and closing said air flow conduit and a servo-unit 111, 216, 217 controlling said main valve, a liquid level sensing member comprising a hollow body 8 immersed in the liquid, the interior of said hollow body being in communication with the liquid in said vessel, a pressure conduit 9 extending between the air space above the liquid within the interior of said hollow body and said servo unit for transmitting thereto the actual values of said liquid level, and means 207-212 for distributing a controlled amount of compressed air from said compressed air source to said pressure conduit 9 only when said main valve is open and delivering compressed air to said pump.

2. A control system as defined in claim 1 for maintaining the level of a liquid in a vessel constant wherein said hollow body which constitutes said liquid level sensing member is established as an extension of said pressure conduit and which has an internal diameter greater than the remainder of said conduit and wherein said means for distributing a controlled amount of compressed air from said compressed air source to said pressure conduit only when said main valve is open and delivering compressed air to said pump is constituted by an auxiliary valve structure formed in part by a movable part 110 of said main valve and which is opened and closed simultaneously with opening and closing of said main valve.

3. In a control system for maintaining the level of a liquid in a vessel constant, the combination comprising a source 12 of compressed air, a pump 5 actuated by compressed air from said source for pumping liquid from a supply container 7 to said vessel, control valve means 10 interposed in air flow conduits 11, 13 between said compressed air source and said pump for controlling the flow of compressed air to said pump, a liquid level sensing member comprising a hollow body 8 immersed in the liquid, the interior of said hollow body being in communication with the liquid in said vessel, a pressure conduit 9 extending from the air space above the liquid within said hollow body to said control valve means, said control valve means including a main valve which comprises a valve seat 100 provided with connections for the conduits 11 and 13 leading respectively to said compressed air source and pump and a first diaphragm 110 which alternatively engages said valve seat thereby to interrupt the flow of compressed air to said pump or is disengaged from said seat thereby to permit flow of compressed air to said pump, and said control valve means further including a servo unit comprising a cover 102 provided with a connection to said pressure conduit 9 and a second diaphragm 111 movable in response to the pressure in said pressure conduit 9, and a valve body 101 disposed between said first and second diaphragms, said valve body including a passage 216, 217 between said main valve and said servo unit, said passage being either open or closed in response to the position of said second diaphragm.

4. A system for liquid level control as defined in claim 11 and wherein said control valve means 10 further includes a first diaphragm chamber I located between said valve seat 100 and one side of said first diaphragm 110 and which communicates through a channel 202 and said conduit 11 with said compressed air source, and a second diaphragm chamber II located at the opposite side of said first diaphragm and which communicates on the one hand through passages 203, 204, 205 with said conduit 11 and said compressed air source, and on the other hand through said passage 216, 217 with a third diaphragm chamber III located at one side of said second diaphragm 111 and including an opening 213 to atmosphere, and a fourth diaphragm chamber IV located at the opposite side of said second diaphragm and connected to said pressure conduit 9, said fourth diaphragm chamber via passages 212, 211, 210, 209, 208 being placed in communication in response to the position of said first diaphragm 110 with an opening 207 in said valve seat facing said first diaphragm.

5. A system for liquid control as defined in claim 4 and which further includes a spring 112 acting upon said first diaphragm and biasing the same towards its seat 100.

References Cited

UNITED STATES PATENTS

| | | | |
|---|---|---|---|
| 1,748,361 | 2/1930 | Mingus et al. | 103—16 |
| 1,979,127 | 10/1930 | Warrick | 103—25 X |
| 2,620,818 | 12/1952 | Symmons | 137—413 |
| 2,765,804 | 10/1956 | Dinkelkamp | 103—16 |
| 2,988,099 | 6/1961 | Langhans | 137—403 |
| 3,052,254 | 9/1962 | Parks | 137—414 X |
| 3,058,485 | 10/1962 | McQueen | 137—403 |
| 3,104,678 | 9/1963 | Cole | 137—403 |
| 3,123,004 | 3/1964 | Irwin et al. | 103—16 |

DONLEY J. STOCKING, *Primary Examiner.*

WILLIAM L. FREEH, *Examiner.*